United States Patent [19]

Pitts

[11] Patent Number: 4,667,413

[45] Date of Patent: May 26, 1987

[54] INCLINOMETERS

[75] Inventor: Geoffrey Pitts, New Milton, United Kingdom

[73] Assignee: Penny & Giles Potentiometers Limited, Dorset, United Kingdom

[21] Appl. No.: 819,848

[22] Filed: Jan. 17, 1986

[30] Foreign Application Priority Data

Jan. 22, 1985 [GB] United Kingdom ................. 8501571

[51] Int. Cl.⁴ ......................... G01C 9/06; G01C 9/08; G01C 9/12

[52] U.S. Cl. ....................................... 33/344; 33/345; 33/366; 33/391

[58] Field of Search ................. 33/344, 345, 346, 366, 33/391, 401, 402

[56] References Cited

U.S. PATENT DOCUMENTS

| | | |
|---|---|---|
| 1,348,055 | 7/1920 | Saeger ................................... 33/344 |
| 2,313,733 | 3/1943 | Crane .................................... 33/391 |
| 2,803,887 | 8/1957 | Fry, Jr. ................................. 33/345 |
| 3,059,343 | 10/1962 | Kermore ............................... 33/391 |

FOREIGN PATENT DOCUMENTS

| | | |
|---|---|---|
| 120275 | 11/1918 | United Kingdom ................. 33/344 |
| 1497809 | 1/1978 | United Kingdom . |
| 1572559 | 7/1980 | United Kingdom . |
| 2101326 | 1/1983 | United Kingdom . |
| 628402 | 10/1978 | U.S.S.R. ............................... 33/391 |

Primary Examiner—Richard R. Stearns
Attorney, Agent, or Firm—Lewis H. Eslinger

[57] ABSTRACT

An inclinometer comprises a casing, a pendulum mounted in the casing and having a pendulum swing axis, a mass in the form of a flywheel mounted in the casing and which tends to remain stationary when the casing is rotated about the pendulum swing axis, and a damping means coupling the pendulum to the flywheel.

7 Claims, 3 Drawing Figures

INCLINOMETERS

BACKGROUND OF THE INVENTION

1. Field of the Invention

This invention relates to inclinometers. Inclinometers are used for measuring the angle of displacement of a body or structure relative to the vertical.

2. Description of the Prior Art

Inclinometers normally comprise a casing and a mass which is movably supported relative to the inclinometer casing. The mass is usually a pendulum, so that when the inclinometer casing is rotated about a horizontal axis, the pendulum tends to remain vertical, and consequently there is a relative angular displacement between the pendulum and the inclinometer casing. By measuring this relative displacement directly or indirectly, the inclination of the inclinometer casing, and therefore of a structure to which it is attached, can be determined.

If the inclinometer is subjected to mechanical vibration, the pendulum may begin to oscillate about the pendulum swing axis. Such oscillations may become particularly large when the frequency of vibration has a similar value to that of the pendulum swing frequency. To reduce this problem, the pendulum is usually damped relative to the inclinometer casing. That is, relative movement between the pendulum and the inclinometer casing is used to dissipate the kinetic energy of the oscillating pendulum is heat, for example using friction or by first converting the kinetic energy into electrical energy and then dissipating the electrical energy as heat in a resistance. Throughout this specification the term "damping" is used to cover any suitable means for dissipating the kinetic energy of oscillation as heat energy. Also throughout this specification the term "pendulum swing axis" means the axis about which the total pendulum assembly can be considered to be rotating at any instant in time. In the case of a simple pivoted pendulum, the pendulum swing axis is the axis of the pivot, but in a more complex support the position of the pendulum swing axis could vary with time.

When damping is provided, any change in the inclination of the structure to which the inclinometer is attached still results in a relative movement between the pendulum and the inclinometer casing, but the effect of the damping is to impart a force to the pendulum, displacing it from the vertical. As a consequence, when the change in the inclination has ceased, the pendulum returns to its vertical position, but this vertical position is only reached after a period of time has elapsed. Consequently, the response rate of the inclinometer is determined by the settling time required for the pendulum to return to the vertical and such inclinometers cannot be used in dynamic applications where a fast response rate is required.

Conventional inclinometers normally comprise a single pivot with a horizontal axis from which is suspended a mass on some form of rigid link to form the pendulum. The shape of the link may be geometrically complex and may provide some of the pendulum mass. Horizontal oscillations of the pivot axis can result in the centre of gravity of the mass tending to remain stationary, and an angular rotaion being imparted to the pendulum. Therefore horizontal oscillations of the pivot axis result in angular oscillations of the pendulum and consequent loss of stability of the inclinometer output signal.

SUMMARY OF THE INVENTION

One object of the present invention is to provide an inclinometer in which these problems are reduced.

Another object of the present invention is to provide an inclinometer having a fast response rate.

Another object of the present invention is to provide an inclinometer comprising a pendulum assembly including two masses, and a third mass which is movable about the pendulum swing axis and is coupled to the pendulum assembly by a damping means.

According to the present invention there is provided an inclinometer comprising:

a casing;

a pendulum assembly mounted in said casing and having a pendulum swing axis, said pendulum assembly comprising an out of balance mass the centre of gravity of which is spaced from said pendulum swing axis and a second mass which is balanced about said pendulum swing axis;

a third mass movable about the pendulum swing axis and which tends to remain stationary when said casing is rotated about said pendulum swing axis; and a damping means coupling said pendulum assembly to said third mass.

Preferably said second mass has a moment of inertia about said pendulum swing axis which is large relative to the moment of inertia of said out of balance mass about said pendulum swing axis.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1B:
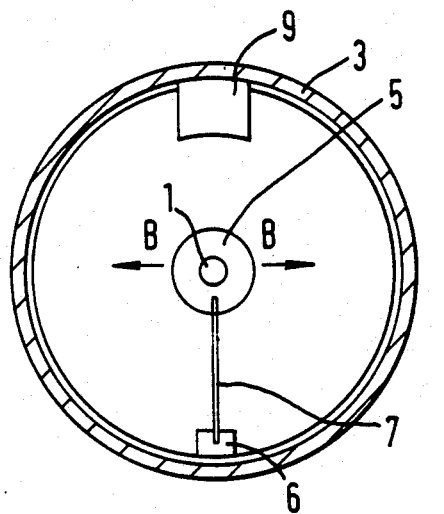
FIG. 1B shows a sectional view on the plane indicated by the arrows A—A in FIG. 1A.
Figure 1A:
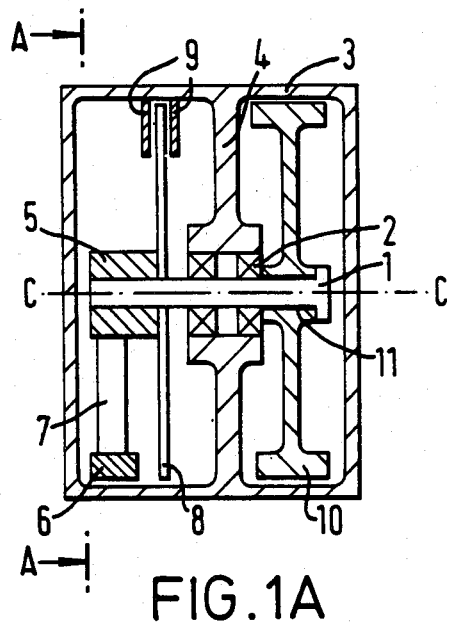
FIG. 1A shows a cross-sectional view in the vertical plane through a pendulum axis of a first embodiment of inclinometer according to the present invention.

Referring to FIGS. 1A and 1B, the first embodiment of inclinometer comprises a shaft 1 which forms the pendulum swing axis and which is supported in bearings 2. The bearings 2 provide a radial and axial constraint on the shaft 1 but allow the shaft 1 to rotate. The bearings 2 are held within a casing 3 of the inclinometer by means of a web structure 4. A hub 5 is rigidly attached to the shaft 1. An out of balance mass 6 is connected to the hub 5 by means of a flexure 7. The flexure 7 is a thin strip of material such as metal and bends freely in directions in the same plane as FIG. 1B, but is relatively rigid in directions in the plane of FIG. 1A.

Rigidly attached to the shaft 1 is a transducer disc 8. Cooperating with the transducer disc 8 to form an angular transducer is a transducer assembly 9 which is mounted on the inclinometer casing 3 and supplies an output electrical signal giving a measure of the inclination of the inclinometer casing 3 by measuring the relative angular displacement between the transducer disc 8 and the transducer assembly 9. The transducer assembly 9 may operate, for example, resistively, capacitively, inductively or optically to measure this relative displacement. Alternatively, the transducer assembly 9 could be replaced by a simple pointer arrangement against which the transducer disc 8 provides a simple direct visual indication.

A flywheel 10, which has a large moment of inertia about the axis of the shaft 1 relative to that of the pendulum, is mounted on the shaft 1 by way of a friction bearing 11 which permits the the flywheel 10 to rotate relative to the shaft 1. The pendulum assembly comprises the hub 5, the out of balance mass 6, the flexure 7, the transducer disc 8 and, when there is no slip at the surfaces of the friction bearing 11, it also comprises the flywheel 10.

The operation is as follows. Under steady state conditions, the inclinometer casing 3, which is attached to a structure such as a crane arm, the inclination of which is to be measured, rotates about the axis defined by the centre line C—C of the shaft 1. Assuming that the friction at the bearings 2 is negligible, all the elements supported on the shaft 1 remain substantially unrotated in space, and consequently relative displacement takes place between the transducer disc 8 and the transducer assembly 9. This is a simple inclinometer function, and this reltive rotation can take place rigidly without any significant disturbance of the elements supported on the shaft 1. An output of the inclination is therefore supplied by the transducer assembly 9.

If alternatively, or in addition, the inclinometer is subjected to horizontal vibrations as indicated by B—B in FIG. 1B normal to the axis of the shaft 1, then the out of balance mass 6 of the pendulum will tend to remain stationary so imparting a rotation to the shaft 1. However, this rotation of the shaft 1 is resisted by the inertia of the transducer disc 8 and, provided that no slip is taking place at the friction bearings 11, it is also, and more substantially, being resisted by the inertia of the flywheel 10. Moreover, the torque exerted by the out of balance mass 6 on the shaft 1 is limited by the flexibility of the flexure 7. The combined effect is to cause the relative displacement between the transducer disc 8 and the transducer assembly 9, due to this vibration, to be small, and at least for relatively small levels of vibration the relative displacement can be made less than the read-out tolerance of the inclinometer.

If the frequency of such a vibration is similar in value to that of the swing frequency of the pendulum, then it is likely that, despite the inertia of the transducer disc 8 and the flywheel 10, the amplitude of the angular oscillation between the transducer disc 8 and the transducer assembly 9 will continue to grow. Under these conditions the angular accelerations of the shaft 1 which are transmitted to the flywheel 10 result in high shear forces at the friction bearing 11, which in turn leads to slippage at the friction bearing 11 and the resulting friction at the rubbing surfaces generates heat. This heat is in fact the energy of the swinging pendulum being dissipated, and therefore the motion of the pendulum is damped, and the amplitude of oscillation between the transducer disc 8 and the transducer assembly 9 is limited. A similar damping is achieved if the inclinometer is subjected to a period of large horizontal acceleration, not necessarily in the form of a vibration.

Figure 2:
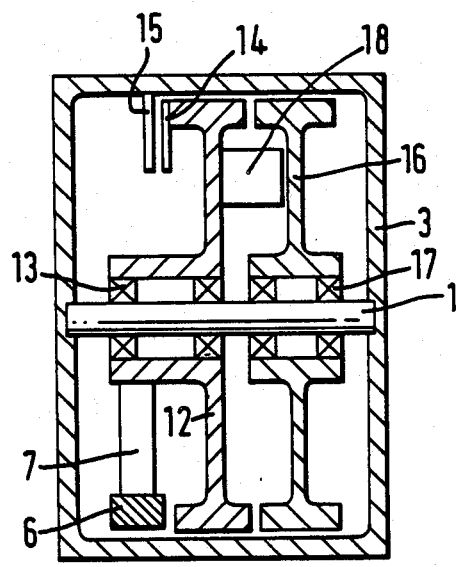
FIG. 2 shows a cross-sectional view in the vertical plane through a pendulum axis in a second embodiment of inclinometer according to the present invention.

Referring now to FIG. 2, this shows the second embodiment. This inclinometer comprises a shaft 1 rigidly mounted in a casing 3 and carrying an out of balance mass 6 supported on a flexure 7, similar to that described in the first embodiment. The flexure 7 is attached to the hub of a flywheel 12 which has its mass concentrated around its periphery to give a large polar moment of inertia. The flywheel 12 is supported on the shaft 1 by bearings 13. One element 14 of an angular transducer is attached to the periphery of the flywheel 12 and the other elment 15 of the angular transducer is secured to the inclinometer casing 3. The pendulum assembly comprises the out of balance mass 6, the flexure 7, the flywheel 12, and the transducer element 14.

A further flywheel 16 is supported on the shaft 1 by bearings 17 and at least the web of the flywheel 16 is formed of electrically conductive material. A permanent magnet 18 is attached to the flywheel 12 so as to have one face in close proximity to the web of the flywheel 16.

The operation is as follows. Under steady state conditions the flywheels 12 and 16 tend to remain stationary when the inclinometer casing 3 is rotated. Such rotation of the inclinometer casing 3 therefore results in a fast response output from the transducer elements 14 and 15 to provide a measure of the inclination. When subjected to vibration or horizontal acceleration, the tendency of the pendulum to rotate relative to the shaft 1 is resisted firstly by the polar moment of inertia of the flywheel 12 to which the flexure 7 is secured, and secondly by the polar moment of inertia of the flywheel 16 which is loosely coupled to the flywheel 12 by the action of the permanent magnet 18.

Under horizontal vibration conditions normal to the pendulum axis, the flexure 7 limits the torque transmitted by the out of balance mass 6 to the flywheel 12. Due to the large polar moment of inertia of the flywheel 12, such torque results in only a limited amplitude of angular oscillation of the flywheel 12. Because the flywheel 16 is balanced about the shaft 1, it is substantially unmoved by rotation of the inclinometer casing 3, and it is also unmoved by horizontal vibrations normal to the pendulum axis. The flywheel 16 provides the mass against which the pendulum is damped. In this embodiment the damping is achieved by the relative motion between the permanent magnet 18 and the flywheel 16 which results in electric currents flowing within the structure of the flywheel 16 and the dissipation of energy as heat. This is commonly known as eddy current damping, but other forms of damping such as friction damping could alternatively be used in this embodiment.

Thus in both embodiments the pendulum assmbly comprises a mass of large polar moment of inertia which is balanced about and free to move about the pendulum swing axis, and an out of balance mass mounted on some form of angular spring, so that from a dynamic point of view the out of balance mass is angularly decoupled from the balanced mass so that angular excursions of the balanced mass resulting from horizontal oscillations are less than they would be if the out of balance mass were rigidly coupled to the balanced mass. In consequence, the out of balance mass experiences only limited accelerations and in turn the dynamic reaction forces transmitted to the balanced mass are small. This reduces the angular displacement of the balanced mass. The spring has, however, adequate stiffness to rotate the balanced mass to the position representing the condition where the centre of gravity of the out of balance mass lies vertically beneath the pendulum swing axis. Moreover, each embodiment includes a balanced mass with a large polar moment of inertia, which is free to rotate about the pendulum swing axis, and against which the pendulum assembly is damped.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An inclinometer comprising:
   a casing;
   a shaft mounted in said casing;
   a pendulum assembly mounted on said shaft and having a pendulum swing axis, said pendulum assembly comprising an out of balance mass the centre of gravity of which is spaced from said pendulum swing axis, and a second mass which is balanced about said pendulum swing axis and is coupled to said out of balance mass by a coupling which includes a spring;
   a third mass mounted on said shaft and movable about said pendulum swing axis, and which is balanced about said pendulum swing axis and tends to remain stationary when said casing is rotated about said pendulum swing axis; and
   a damping means coupling said pendulum assembly to said third mass; said second mass having a moment of inertia about said pendulum swing axis which is large relative to the moment of inertia of said out of balance mass about said pendulum swing axis.

2. An inclinometer according to claim 1 wherein said spring comprises a metal strip.

3. An inclinometer according to claim 1 wherein said third mass comprises a flywheel.

4. An inclinometer according to claim 3 wherein said shaft is rotatable relative to said casing, said spring is secured to a hub secured on said shaft, and said flywheel is mounted on said shaft by way of a friction bearing which forms said damping means.

5. An inclinometer according to claim 3 wherein said shaft is fixed relative to said casing, said flywheel is rotatably mounted on said shaft, and said spring is secured to the hub of a further flywheel which is also rotatably mounted on said shaft and forms said second mass, and said damping means loosely couples said further flywheel to said flywheel.

6. An inclinometer according to claim 5 wherein said damping means comprise a permanent magnet mounted on said further flywheel for generating eddy currents in said flywheel when there is relative rotation between said flywheel and said further flywheel.

7. An inclinometer according to claim 1 further comprising angular transducer means for providing an indication of the rotation between said second mass and said casing.

* * * * *